April 1, 1958    W. E. SARGEANT    2,829,324
LOW VOLTAGE ELECTRICAL MOTIVE MEANS
Filed Dec. 8, 1954    2 Sheets-Sheet 1

Inventor
Walter E. Sargeant
R. E. Fowler
Attorney

April 1, 1958 W. E. SARGEANT 2,829,324
LOW VOLTAGE ELECTRICAL MOTIVE MEANS
Filed Dec. 8, 1954 2 Sheets-Sheet 2

Inventor
Walter E. Sargeant
By R. E. Fowler
Attorney

United States Patent Office 2,829,324
Patented Apr. 1, 1958

2,829,324

LOW VOLTAGE ELECTRICAL MOTIVE MEANS

Walter E. Sargeant, Huntington Woods, Mich., assignor to General Motors Corporation, Detroit, Mich., a corporation of Delaware Application December 8, 1954, Serial No. 473,877

14 Claims. (Cl. 318—128)

This invention relates to electrical driving means and, more particularly, to electric motive means operable from low voltage direct current. There are many instances in which it is desired to obtain a stable drive for electrical motors when only low voltage D. C. power is available. This is particularly true in automotive vehicles where the only source of power is the car battery. One application for constant speed motor drives in cars is for clock operation. Heretofore electrical clocks operated in automotive vehicles have included mechanically operated electrical contacts which are a major source of failure inasmuch as they pit and burn and sometimes stick after continued uses.

It is, therefore, an object in making this invention to provide electric motive means operable from a direct current source and having substantially constant revolutions per minute.

It is a further object in making this invention to provide an electric motor operable from a low voltage D. C. source having no mechanically movable electrical contacts.

It is a still further object in making this invention to provide an electrical clock utilizing transistor control circuits.

With these and other objects in view which will become apparent as the description proceeds, the embodiments of my invention will be best understood by reference to the following specification and claims and the illustrations in the accompanying drawings, in which:

Fig. 1 is a circuit diagram of an electrical motor system suitable for clocks embodying my invention;

Fig. 2 is a circuit diagram of a modified form of electrical motor circuit; and

Figure 3:
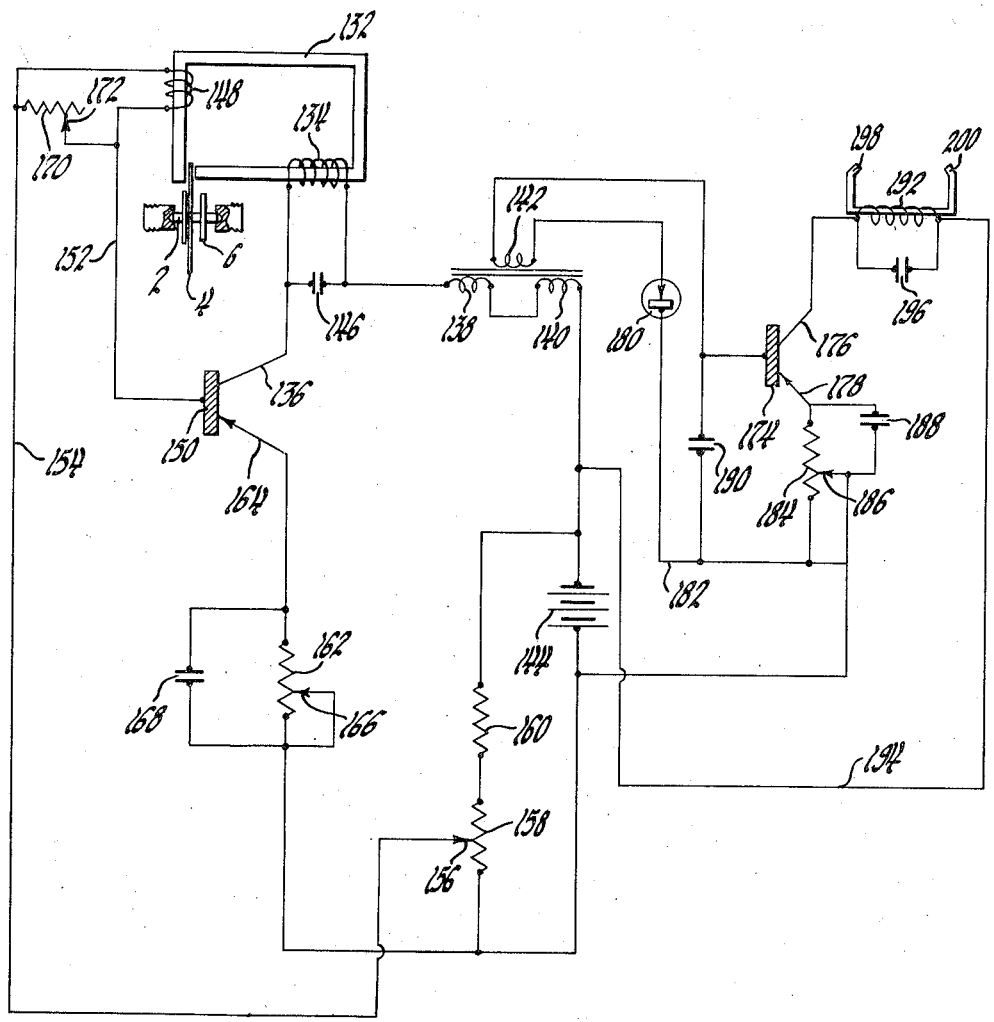
Fig. 3 is a circuit diagram of a further modified form of electrical circuit.

Referring now more particularly to the drawings, the system shown in Fig. 1 is one which employs an electric oscillator system that is operated intermittently to furnish a series of driving pulses for turning the motor shaft or balance wheel to maintain the shaft in oscillation or rotation for timing purposes. The control of the oscillator is provided by means commonly connected to the balance wheel and mechanically interlocks the oscillator thereto. The shaft 2 of the balance wheel in this instance is provided with a plurality of discs 4 and 6 which are axially spaced on said shaft. The first disc 4 is formed of copper or other similar magnetic shielding material and it is used to intermittently cut off the oscillator. The second disc 6 is formed of a magnetic material such as soft iron and is used for driving the balance wheel. The oscillator in this instance consists of a junction transistor 8 having a base 10, an emitter electrode 12 and a collector electrode 14. The collector electrode is connected through conductor 16 to one terminal of an inductance 18 and also one terminal of a condenser 20. The other terminal of the inductance 18 is connected to a conductor 22 which is also connected to the condenser 20. These two members form the tank circuit for the oscillator and determine the frequency of oscillation. The inductance 18 has a magnetizable core 24 which may be formed of ferrite in order to concentrate the magnetic field.

The base 10 of the transistor 8 is connected to one terminal of a second inductive coil 26 through line 25 which is spaced from the first coil 18 but aligned therewith so that the magnetic fields of the two may couple. This coil 26 is also provided with a similar core 28 which, as before, may be made of a ferritic material. The opposite terminal of the coil 26 is connected to a conductive line 30 which extends to one terminal of a resistor 32 and also to an adjustable tap 34 on resistor 36. One end of resistor 36 is connected to conductor 25. The opposite terminal of resistor 32 is connected directly to the emitter electrode 12 of the transistor and also to one terminal of a limiting resistor 38. An adjustable tap 40 movable over resistor 32 is connected through line 42 to the base 44 of an amplifying transistor 46. The emitter electrode 48 of the transistor 46 is connected directly to one side of a battery 50 which may be the main storage battery of the vehicle and to the resistor 38. A small biasing battery 52 is connected across resistor 32.

The positive side of the main supply battery 50 is connected through conductor 54 to one terminal of a motor coil 56 and also to one terminal of a relay coil 58 to provide power therefor. The opposite side of the motor coil 56 is connected directly to line 22 running from the tank circuit of the oscillator. A condenser 60 is connected across the driving coil 56 and a rectifier 62 is connected across the same coil in parallel with the condenser. The other terminal of the relay coil 58 is connected through line 64 with the collector electrode 66 of the amplifying transistor 46.

The shielding copper disc 4, which is mounted on the shaft 2, is provided with a notched portion 68 which permits magnetic interlinkage between the two coils 18 and 26 at one position of rotation of the disc 4 but in all other positions of the disc shields one coil from the other and prevents interaction. In like manner, the soft iron disc 6 also mounted on the shaft 2 is made of an irregular shape so that rotative forces may be applied thereto by the extending poles 70 and 72 of the core upon which the motor coil 56 is mounted. Delaying ring means 74 are mounted on the poles 70 and 72 to delay the application of magnetic field means to the disc 6.

In general, therefore, this system consists of a transistor oscillator in which the position of the disc 4 determines whether or not the oscillator shall be operative. During most of the rotation of the disc 4 there is no magnetic interlinkage between coil 18 and coil 26 and, therefore, the oscillator does not oscillate. However, if the disc 4 continues to rotate and notch 68 is positioned to permit inductive interlinkage between these two coils, the oscillator will go into oscillation and continue until the notch has turned to again cause cutoff between the two coils. The average D. C. component of the collector current of the oscillator passes through the motor coil 56, creating a magnetic field at that point of rotation of the disc 4 and its associated shaft 2 which bears disc 6. At that instant the configuration of the disc 6 causes the field created across the poles 70 and 72 to tend to cause a driving pulse in the direction in which it is rotating and, therefore, twice during each oscillation of the shaft additional energy is impressed thereupon to cause it to continue its oscillation. By such a construction, which includes no mechanical contacts for making or breaking the circuit to the motor means, a series of synchronously timed pulses is provided which operates from the ordinary car battery voltage. By movement of the tap 34 on resistor 26, the oscillator output may be adjusted.

In order to interfere as little as possible with the time-keeping function of the balance wheel, instead of having the shaft itself drive the clock mechanism through gearing or some similar means, the present system utilizes a counting relay. Each time the transistor oscillator goes into oscillation and applies a driving pulse to the disc 6, a similar but amplified pulse is applied to the relay coil 58 through the amplifying action of transistor 46 which is applied across the oscillator output. Thus, when a driving pulse is provided by oscillatory action, the relay 58 is actuated to attract its armature 76 which may be connected to any type of counting circuit and actuate timekeeping means. Adjustment of tap 40 will vary the amplification factor of this stage. It is, therefore, obvious that in this system a simple continuously operable motive means for clock mechanism is provided which is operated by low voltage D. C.

The systems shown in Fig. 2 utilizes, instead of a copper disc such as 4 which cuts off magnetic interaction in the oscillator system, a capacity variation for throwing the oscillator in and out of action. Thus, in this instance a small disc 78 mounted on the balance shaft 2 takes the place of the disc 4. This disc 78 is formed in the main of insulating material but has a small metallic pie-shaped sector 80 which is grounded through the shaft of the balance wheel. Mounted in stationary relation to the disc 78 is a similarly shaped conductive member 82 which, during one position of rotation of disc 78, lies in alignment with the sector 80 and forms therewith a condenser having desired capacity. At other positions, no interrelation of the two exists. The conductive member 82 is connected through a choke coil or inductance 84 to one terminal of a coupling coil 86, the opposite side of which is connected through a condenser 88 to a conductor 90. Conductor 90 extends from one terminal of a coil 92 to the collector electrode 94 of the transistor for the oscillating section.

The other terminal of coil 92 is connected through a second coil 95 to a conductor 96 extending to one terminal of an output transformer winding 98. The emitter electrode 100 of the transistor is connected to ground and the base 102 through a resistance 104 to a tap 106 on resistor 108. Resistor 108 is connected in series with a second resistor 110 directly across the main battery 112. By adjusting the position of the tap 106 on resistance 108, the biasing voltage applied to the base 102 of the transistor may be varied. One side of the battery 112 is connected to the transformer winding 98 and the other side connected through conductor 114 to one side of a resistor 116, the opposite terminal of which is grounded. An adjustable tap 118 is provided for cutting out a portion of the resistor 116 and a condenser 120 is connected in parallel with that portion of said resistor 116 which is not short circuited. A secondary transformer winding 122 associated with the primary winding 98 provides an output for the system and one terminal of that winding 122 is connected through a rectifier 124 to an output terminal 126. The other side of the transformer winding 122 is connected to output terminal 128 and a condenser 130 is connected across the two output terminals to provide a slight delay time. The clock drive coil may be connected across the output terminals.

In this instance, Fig. 2 discloses only the oscillator portion of the system. The same driving device could be used with this system as that shown in Fig. 1. As in Fig. 1, as the balance shaft 2 oscillates, the segment 80 of the disc 78 will come into alignment with the similar shaped member 82 causing a capacity coupling between the two and complete the oscillator circuit including inductance 86 and condenser 88 which goes into oscillation providing an output in transformer winding 98. This output is rectified and applied to the output terminals 126, 128 and therefore twice each oscillation a pulse is provided which can be resupplied to the balance shaft as in Fig. 1 to cause it to continue to oscillate and therefore maintains operation. The various adjustments of tap 106 and 118 on their associated resistors provides an adjustment of the bias on the base and also the voltage applied to the transistor to obtain proper action. In this instance there is a series resonant feedback to the collector electrode from the emitter through the capacity provided by the small segment in the balance wheel to cause the oscillator to continue its normal operation. This creates a pulse which can be rectified and applied to clock operating means.

In the form of system disclosed in Fig. 1, the average collector current increases when the device breaks into oscillation. The point, however, at which the system goes into oscillation may drift with temperature. Since most automobile clocks are subject to relatively wide variation in temperature, it is important to provide some temperature compensating means and this has been included in the system shown in Fig. 3 where such compensation is provided by negative feedback which is used to stabilize the average value of collector current. In this instance, again, the balance shaft 2 is disclosed upon which is mounted a copper disc 4 as in Fig. 1 and the driving disc 6. A magnetic core 132 is diagrammatically shown upon which the oscillating coil 134, corresponding to coil 18, is mounted which has one terminal connected to the collector electrode 136 of the transistor for the oscillator and the other connected to one winding 138 of a matching transformer. Winding 138, in series with a second spaced winding 140, form the primary of the transformer and a further winding 142 forms the secondary. The opposite terminal of winding 140 is connected directly to the main battery 144.

A condenser 146 is connected across the coil 134 to form the resonant circuit for the oscillator. A feedback coil 148, corresponding to coil 26 in Fig. 1, is also mounted on the core 132 and has one side connected to the base 150 of the transistor through conductor 152. The opposite terminal of the coil 148 is connected through conductor 154 to a variable tap 156 on resistor 158. Two resistances 160 and 158 are connected in series across the battery 144 and resistance 162 between battery 144 and the emitter electrode 164 of the transistor to provide the proper voltage thereto. An adjustable tap 166 connected to one end of the resistance 162 is movable over its surface to vary the amount of effective resistance in circuit. A condenser 168 is connected in shunt to resistance 162. A resistor 170 has one terminal connected to conductor 154 and an adjustable tap 172 movable over the resistor 170 is connected directly to conductor 152. This varies the potential applied across coil 148. That portion of the system just described includes the transistor oscillator in which a certain amount of current is fed back to maintain the oscillator operation and this is obtained from the coil 148 which is mounted on the core 132. The amount of oscillation may be adjusted by moving the tap 172 over the resistor 170.

The oscillator, of course, produces a definite output frequency and the matching transformer consisting of component primary windings 138 and 140 and secondary winding 142, is matched to the frequency of the oscillator to produce maximum output in that circuit. The output of the oscillator as applied to the secondary winding 142 is further applied to an amplifying transistor which consists of a base 174, collector electrode 176 and emitter electrode 178. One side of the coil 142 is connected directly to the base 174 of the transistor and the opposite side of the coil 142 through rectifier 180 to conductive line 182 which extends to the battery 144. Line 182 is also connected through a limiting resistor 184 to the emitter electrode 178. An adjustable tap 186 is connected to line 182 and can be moved over the surface of resistor 184 to vary the amount of stabilizing feedback in circuit. A condenser 188 is connected across the effective portion of the resistance 184. A condenser 190 is connected between base 174 and conductor 182. The collector electrode 176 is connected directly to the motor coil 192 which is supplied with power from conductor 194 extending from the battery 144. A condenser 196 is connected across the motor coil 192.

In this instance when the oscillator breaks into oscillation due to the rotation of the disc 4, a pulse is applied to the matching transformer and thence induced in the secondary 142 at the frequency of the oscillator. This is rectified through rectifier 180 and applied as a direct current pulse to the base and emitter electrodes of an amplifying transistor. The resultant amplified current is applied to the motor coil 192 creating a magnetic field between poles 198 and 200, which impress torque on the driving disc 6 to cause continued rotation of the balance shaft and operation of desired apparatus. In order to stabilize the operating point of the oscillator, a feedback signal is applied to the input of the oscillator through current induced in coil 148 and a proportionate amount of it fed back to the base and emitter electrodes determined by the setting of the tap 172. The system shown in Fig. 2 has the further advantage that by using a rectifier, it is not critically dependent upon the average value of the oscillating current and therefore is less affected by temperature changes.

I claim:

1. In an electrical control system, an oscillator, movable means associated with the oscillator to cut off the same when in certain relative positions with respect thereto, further movable means mechanically connected to the first movable means and movable therewith, flux generating means mounted adjacent the further movable means to apply a force thereto, said flux generating means being connected to the oscillator output and energized when said oscillator is energized to apply a force to said further movable means.

2. In an electrical system, a rotatable shaft, a pair of spaced members of irregular configuration mounted on said shaft for rotation therewith, an oscillator mounted adjacent one of said members and controllable by the configuration of said member as it rotates, a driving coil mounted adjacent the other member to apply a driving flux pulse thereto, and means connecting the driving coil to the output of the oscillator so that as the one member rotates and controls the oscillator, the output of the latter will apply driving force to the other member to maintain the shaft in rotation.

3. In an electrical motor system, a rotatable shaft, a first disc fixed to said shaft having a notched portion, an oscillator mounted adjacent said disc so that the disc may intercept the feedback energy and cause the oscillator to stop but permit oscillation when the notch is in proper position, a magnetic member of irregular configuration mounted on said shaft, a driving coil mounted adjacent said magnetic member and connected to the output of the oscillator to apply a driving pulse to the member when the oscillator breaks into oscillation.

4. In an electrical driving system, a rotary shaft, first and second irregularly shaped members fixedly mounted on said shaft in spaced relation, the first being formed of a non-magnetic substance and the second of magnetizable material, an oscillator mounted adjacent the first and controlled by the rotation thereof, and a driving coil mounted adjacent the second and connected to the output of the oscillator to apply a driving torque thereto when the oscillator is active.

5. In an electrical driving system, a rotary shaft, first and second irregularly shaped members fixedly mounted on said shaft in spaced relation, the first being formed of a non-magnetic substance and the second of magnetizable material, an oscillator mounted adjacent the first and controlled by the rotation thereof, a driving coil mounted adjacent the second and connected to the output of the oscillator to apply a driving torque thereto when the oscillator is active, said first member having a circular shape with a notch at one point to permit oscillator operation only at the notched area and thus provide an oscillator action for a short period only; and said second member of such form that when the driving coil is energized a field will be created to pull the second member in the direction that it is moving and thus drive the shaft.

6. In an electrical system, a junction transistor having a base, emitter and collector electrodes, a tank circuit connected to the collector electrode, inductive means connected to the base and coupled to the tank circuit to provide feedback for oscillator action, a movable member of irregular configuration mounted for movement between the inductance and the tank circuit to intercept the coupling and stop the oscillator, a driving coil connected to the output of the oscillator, and a magnetizable member mechanically connected to the movable member and moving therewith, said magnetizable member being mounted adjacent the driving coil and having a flux applied thereto to move the same when the oscillator is operative.

7. In an electrical system, a junction transistor having a base, emitter and collector electrodes, a tank circuit connected to the collector electrode, inductive means connected to the base and coupled to the tank circuit to provide feedback for oscillator action, a movable member of irregular configuration mounted for movement between the inductance and the tank circuit to intercept the coupling and stop the oscillator, a driving coil connected to the output of the oscillator, a magnetizable member mechanically connected to the movable member and moving therewith, said magnetizable member being mounted adjacent the driving coil and having a flux applied thereto to move the same when the oscillator is operative, amplifying means connected to the oscillator output and a counting relay connected to the amplifying means to count the oscillator energizations which correspond to the movement of the movable members.

8. In an electrical system, an oscillator, a rotary member mounted adjacent the oscillator and controlling the energization thereof during its rotation, a second rotary member connected to the first, a driving coil mounted adjacent the second member and connected to the output of the oscillator to apply a driving pulse to the same when the oscillator is energized.

9. In an electrical system, an oscillator, a rotary member mounted adjacent the oscillator and controlling the energization thereof during its rotation, a second rotary member connected to the first, a driving coil mounted adjacent the second member and connected to the output of the oscillator to apply a driving pulse to the same when the oscillator is energized, amplifying means connected to the oscillator output and counting means connected to the amplifying means.

10. In an electrical system, a transistor oscillator circuit including a tank resonant circuit and a ground circuit, condenser means coupled between the tank circuit and ground to control the oscillation of the oscillator, said condenser means including a movable member and a stationary member that provide the proper capacity to throw the oscillator into operation only when they are in substantial alignment and driving means for the movable member connected to the oscillator and energized by the operation thereof to apply force to the movable member to move the same and thus provide continued operation.

11. In an electrical system, a transistor oscillator circuit including a tank resonant circuit and a ground circuit, condenser means coupled between the tank circuit and ground to control the oscillation of the oscillator, said condenser means including a movable member and a stationary member that provide the proper capacity to throw the oscillator into operation only when they are in substantial alignment driving means for the movable member connected to the oscillator and energized by the operation thereof to apply force to the movable member to move the same and thus provide continued operation, a source of power and adjustable means interconnecting said source of power and said oscillator to control the operation of the latter.

12. In an electrical system, a transistor oscillator for generating a given frequency, timed means for energizing and deenergizing the oscillator, a frequency matching transformer connected to the output of the oscillator, driving means synchronized with the timed means and a driving coil connected to the transformer to actuate said driving means synchronized with the timed means for controlling the oscillator.

13. In an electrical system, a transistor oscillator for generating a given frequency, timed means for energizing and deenergizing the oscillator, a frequency matching transformer connected to the output of the oscillator, an amplifier connected to the transformer to amplify the output thereof, driving means synchronized with the timed means, a driving coil connected to the output of the amplifier to actuate said driving means synchronized with the timed means, and adjustable feedback means connected to the oscillator to stabilize the action thereof.

14. In an electrical system, a transistor oscillator for generating a given frequency, timed means for energizing and deenergizing the oscillator, a frequency matching transformer connected to the output of the oscillator, driving means synchronized with the timed means, a driving coil connected to the transformer to actuate said driving means synchronized with the timed means for controlling the oscillator, and adjustable feedback means connected to the oscillator to stabilize the action thereof.

References Cited in the file of this patent

UNITED STATES PATENTS

| | | |
|---|---|---|
| 1,563,727 | Curtis | Dec. 1, 1925 |
| 1,631,021 | Dowling | May 31, 1927 |
| 2,094,351 | Draper | Sept. 28, 1937 |
| 2,154,287 | Schewe | Apr. 11, 1939 |
| 2,234,895 | Curveny | Mar. 11, 1941 |

OTHER REFERENCES

Radio and Television News, February 1954, pages 40–41.

QST, December 1953, pages 35–38.